United States Patent [19]

Saum

[11] 4,420,969
[45] Dec. 20, 1983

[54] ORIFICE METERING FAN DEVICE

[75] Inventor: Arthur M. Saum, Waynesboro, Va.

[73] Assignee: Saum Enterprises, Inc., Falls Church, Va.

[21] Appl. No.: 269,755

[22] Filed: Jun. 2, 1981

[51] Int. Cl.³ .............................................. G01M 3/04
[52] U.S. Cl. .......................................... 73/40; 52/302; 73/198
[58] Field of Search .......................... 73/40, 49.2, 198; 98/1.5, 94, 32

[56] References Cited

U.S. PATENT DOCUMENTS

| | | | |
|---|---|---|---|
| 2,230,158 | 1/1941 | Crawford | 119/37 |
| 2,898,836 | 8/1959 | Lockheed | 98/1.5 |
| 2,928,330 | 3/1960 | Brandi | 98/1.5 |
| 3,252,324 | 5/1966 | Steele | 73/861.58 |
| 3,524,399 | 8/1970 | Bohanon | 98/33 R |
| 3,741,290 | 6/1973 | Nenadal | 98/94 X |
| 3,876,009 | 4/1975 | Johnson, Jr. | 73/861.65 |
| 4,096,744 | 6/1978 | De Leo et al. | 73/861.65 X |
| 4,249,461 | 2/1981 | Christenson et al. | 119/21 X |

Primary Examiner—Daniel M. Yasich
Attorney, Agent, or Firm—Huff & Hanson

[57] ABSTRACT

Disclosed is a device for generating and measuring the flow of a gas, the device being particularly adapted for measuring the magnitude of air infiltration in a building and for locating sources of air infiltration. The device of the invention comprises a propeller-type fan for generating gas flow mounted in a gas flow guide, a drive for rotating the fan, an orifice plate located upstream from the fan, a damper or drive controller for varying the gas flow rate through the orifice, and one or more flow-directing vanes between the orifice plate and the fan, the plane of the orifice plate being approximately parallel to the plane of rotation of the fan, and the orifice and fan being generally concentric and spaced less than one fan diameter apart. The device further comprises a housing enclosing the space between the orifice plate and the fan, a pressure-sensing probe projecting into the housing and located near the orifice plate and between the orifice plate and the fan, and a pressure differential sensor for measuring either the pressure difference between the probe and the static air upstream of the orifice, or the difference in static air pressures downstream and upstream of the device. Also disclosed is a method for determining the magnitude of air infiltration in a building and locating air leaks which utilizes the above device.

14 Claims, 9 Drawing Figures

ORIFICE METERING FAN DEVICE

BACKGROUND OF THE INVENTION

The present invention relates generally to a device for generating and measuring the flow of gas and, more particularly, to a device which is adapted for use in determining air infiltration in buildings and the like. While the device will be discussed hereinafter primarily with reference to the latter use, it should be understood that its utility is not thereby so limited.

The recent escalations in the costs of petroleum products and other types of fuel have focused great national attention on means for conserving energy. One area of significant potential savings in energy is in the energy used to heat and cool buildings such as residential homes. The two major sources of energy loss in buildings are thermal conduction through walls, ceilings and floors, and infiltration of air where, for example, warm inside air is displaced by cold outside air through cracks, holes and other openings in the structure of the building. Techniques for minimizing energy losses by conduction in both new and old buildings are well known (insulating materials of various kinds, storm windows and doors, etc.) and has been well publicized both by public service agencies and commercial manufacturers. Procedures to measure conductive heat loss from buildings such as infra-red scanning are also available.

On the other hand, it is not nearly as generally appreciated that in most buildings, new or old and with or without adequate insulation, air infiltration is still a major source of heat loss. According to one estimate, from 15 to 67% of the total heating energy utilized in residential buildings is due to the infiltration of air. Furthermore, with the exception of weatherstripping around doors and windows and exterior caulking, it is still not general practice in new residential construction to build with a goal of reducing air infiltration to the minimum practical level. Older houses, built in the era of cheap energy, are even worse in this regard.

Techniques to minimize air infiltration are known and in general are relatively inexpensive to accomplish. In order to promote the more widespread application of these techniques and to thereby capitalize on the potential energy savings realized by the use of these techniques, a simple and economical testing device to measure air infiltration in residential homes and other buildings should be made widely available. To be effective, such a testing device should be able to quickly determine how serious a problem air infiltration is in a given structure, and also should be capable of indicating the effectiveness of the steps taken to reduce the air infiltration. In addition, it would also be very useful to be able to identify sources of air leakage in the structure from use of the testing device.

Two instrumental techniques have been described in the literature for estimating the resistance of buildings to air infiltration: (a) a gas diffusion method and (b) a pressurization method. In the latter technique, a device having an exhaust type fan is utilized to establish a given pressure differential between the interior and exterior of the building. From a determination of the flow rate of the air being exhausted from the building, the amount of air exhausted per unit of time can be calculated, e.g., cubic feet per minute (cfm). Then, using the volumetric capacity of the building (total floor area)×(ceiling height), the number of air turnovers per hour (ATPH) is then calculated by the following formula;

$$ATPH = \frac{60 \times (CFM \text{ exhausted at 0.1 in } wc)}{\text{Volume of House, in cu.ft.}}$$

ATPH is conventionally used as an index of the resistance of the house to air infiltration. For example, Sweden has incorporated this index of air infiltration into its national building code for all new construction, in some cases the standards being as low as 1.0 ATPH at 0.2 inches wc pressure. One proposed standard for the Unites States is that for an adequately tight house, ATPH should be between about 1.5 and 5.0 at 0.1 inches wc pressure. It is generally recognized that values below about 1.5 indicate the building may be too tight and therefore subject to problems from the buildup of excessive humidity, odors and/or hazardous fumes. Above a value of about 5.0, air infiltration is apt to be an increasingly high factor in heating or cooling costs for the building. For example, in a relatively new residential home with a heat-pump type heating system, a reduction in the ATPH down to a value about 3 from an unknown initial level has been accompanied by an almost 50% reduction in electrical comsumption for heating compared on a degree-day basis with earlier experience.

Another procedure which has been proposed for expressing the results of the pressurization method for testing air infiltration is by determining a parameter known as the Equivalent Leakage Area (ELA) for the building. ELA is calculated by a graphical procedure using data on air leakage rate versus the differential pressure outside and inside the building, Δp(out/in). This procedure has been used principally in tests with the "Blower Door" testing device described below, but it could also be used with the present invention, if desired.

One known testing device used in the above-mentioned pressurization method for determining air infiltration comprises a tubular section about five feet long and eighteen inches in diameter. Fitted at one end of the tubular section is a tube-axial fan which is belt-driven by a variable-speed, ¾ horsepower electric motor mounted adjacent to the tube. At the other end of the tubular section is a short transitional section to a square cross-sectional shape which is used for mounting the device in an opening such as a door or window in the building to be tested. The interior of the tube is provided with a honey-comb type baffle arrangement to provide laminar air flow therethrough and an array of Pitot tubes are located at a number of points across the tubes cross-section for measuring air velocity. During use of the device, the square end of the tubular section is mounted from the exterior of the building into a convenient window or door opening, the space surrounding the device is sealed, and the other end of the device containing the motor and fan is maintained in place by an adjustable vertical support. Accessory equipment for the device includes an inclined-tube manometer to measure pressures at the Pitot tube locations, and another pressure gauge to measure the pressure difference between the inside and outside of the building.

Two uses of the above-mentioned testing device are described: first, to measure the resistance of the building to air infiltration, and second, to provide assistance in determining the locations of air leakage. For the first use, the speed of the fan drawing air from inside the building is adjusted to produce an outside-to-inside pressure difference of 0.1 inches of water column (wc). The average air velocity inside the tube is then determined from the Pitot tube pressure readings, which in turn permits calculation of the rate (CFM) at which air is being exhausted from the building in order to maintain the 0.1 inch wc pressure differential. With the volumetric capacity of the particular building being tested, and APTH value can then be determined from the previously-mentioned formula.

By increasing the fan speed of the device to generate a maximum of 0.4 inches wc outside-to-inside pressure differential, sources of air leakage in the building can be more easily located. Thus, for example, one can readily locate leakage by simply feeling for drafts in various locations within the building.

While the above-described device is generally adequate for the purpose for which it was designed since it is well-suited for precise, absolute measurements in a scientific study of various factors affecting air infiltration, it may not be considered attractive for widespread use by builders and home-owners for a variety of reasons. For example, the device is relatively expensive, with an estimated cost for materials alone above a thousand dollars. In addition, the size and weight distribution of the device make it relatively inconvenient to transport and it is difficult for one person to mount the device in position for conducting a test. Furthermore, the necessity of converting the multiple Pitot tube pressure readings to air flow in cfm involves a fairly complicated and time-consuming calculation.

Another test device which has been used to measure air infiltration by the pressurization method is a device known as the "Blower Door" which was developed at Princeton University. Air flow rate is determined from masurements of fan rpm, $\Delta p(out/in)$, and air density, by applying a relationship previously established by calibration. This device may have several disadvantages in regard to its large-scale manufacture and routine use. Each device would probably have to be calibrated individually because calibration is sensitive to small variations in dimensions of the fan and other mechanical elements. Accuracy of flow measurement tends to be reduced by the fact that $\Delta p(out/in)$ is a factor in the calibration relationship. The device is somewhat inconvenient for use by one person, since the fan assembly and motor alone weigh about eighty pounds.

SUMMARY OF THE INVENTION

It is therefore among the objects of the pesent invention to provide an air infiltration testing device which is of simpler construction and of a more manageable size and weight so as to enable convenient use by a user such as a builder or a home-owner, particularly in enabling the user to easily transport the device and install it for an air infiltration test of a building.

Another object of the present invention is to provide an air infiltration testing device which enables air flow in cfm to be determined quickly and simply from a single pressure reading and the use of a simple formula, table or graph.

Briefly, the invention in its broader aspects comprehends a device for transferring a gas against a static pressure and simultaneously measuring the volume flow rate of the gas, the device comprising a propeller-type fan for generating gas flow mounted in air flow guide means; drive means for rotating the fan; means for adjusting the gas flow generated by the fan; an orifice plate located upstream from the fan, the plane of the plate being approximately parallel to the plane of rotation of the fan, and the orifice and fan being generally concentric and spaced less than one fan diameter apart; a housing enclosing the space between the orifice plate and the fan; one or more vanes mounted inside the housing between the fan and the orifice plate; a pressure-sensing means projecting into the housing and located near the orifice plate and between the orifice plate and the fan; and a pressure differential sensing means for measuring the pressure differential between the probe and the air-space upstream of the orifice. Also contemplated by the present invention is a method for determining the magnitude of air infiltration in a building utilizing the above-described device.

Various features characterize the device of the present invention. Among others, the device utilizes the pressure drop across an orifice as a measure of air flow rate. While there is extensive prior art on the measurement of gas flow rates with orifices, without known exception the primary aim of this prior art is to maximize accuracy of measurement. For example, in the flow measurement from a plenum through an orifice into a pipe larger than the orifice, it is recommended that the pipe be extended 4 to 12 pipe diameters downstream of the orifice in order to avoid errors due to gas turbulence downstream of an orifice according to published standards of the American National Standard Institute: ANSI/API/2530, "Orifice Metering of Natural Gas"; ASHRAE Std. 41. 7–78, "Procedure for Fluid Flow Measurement of Gases". In contrast, in the subject invention, this distance is greatly reduced and generally is a maximum of only about 0.7 "pipe" diameters. Also in this invention, a fan, which is a generator of turbulence, generally is located less than one fan diameter from the orifice. In addition, another feature is the use of air straightening vanes which are located immediately downstream of an orifice so as to reduce turbulence. The net result of these features of the invention is that the features make possible a compact device which is convenient for its intended use and also provide for accuracy of measurement which is more than adequate for this use.

Further objects, advantages and features of the present invention will become more fully apparent from a detailed consideration of the arrangement and construction of the constituent parts as set forth in the following specification taken together with the accompanying drawings.

DETAILED DESCRIPTION OF THE PREFERRED EMBODIMENTS

Figure 1:
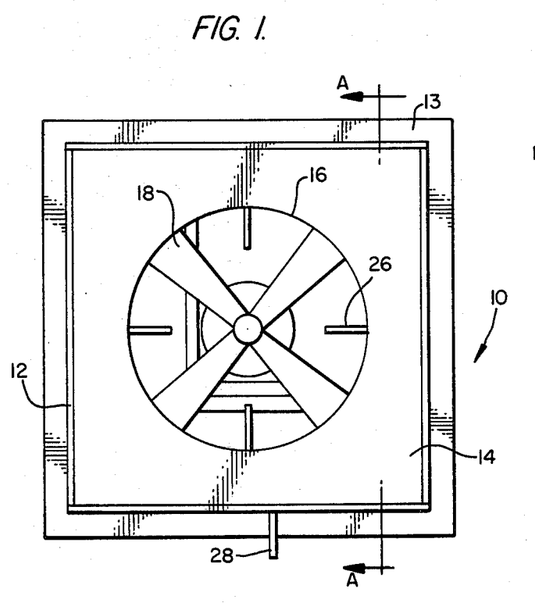
FIG. 1 is a front view of one embodiment of a test device in accordance with the present invention.
Figure 2:
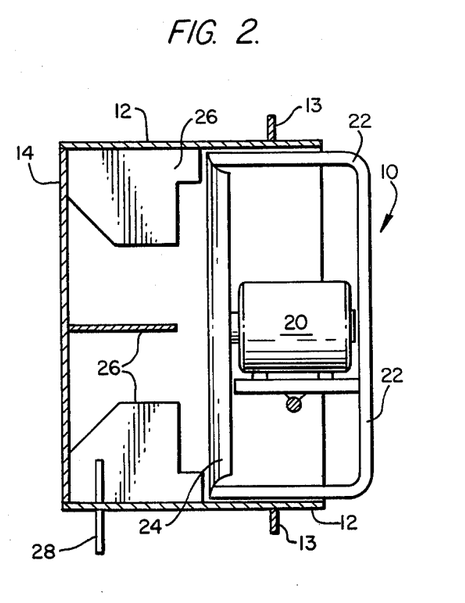
FIG. 2 is a side cross-sectional view of the embodiment of FIG. 1 taken along line A—A.

Referring now to FIGS. 1 and 2 of the drawing, shown is one embodiment of air infiltration testing device 10 in accordance with the present invention. Device 10, which may be generally described as an orifice metering fan, comprises housing 12 which, when viewed from a position such as FIG. 1, is of an open rectangular, preferably square, configuration and is constructed of a suitable rigid material such as wood, metal, plastic or the like. Any joints in housing 12 are sealed with a suitable material such as tape, glue or the like so that the joints are essentially air-tight. About the exterior of housing 12 is a mounting flange 13 used to facilitate securement of the device in a matching hole in a panel, such as hole 62 in panel 60 of FIG. 7, which is mounted in an opening such as a window to provide an essentially air-tight seal between device 10 and the opening.

Figure 3:
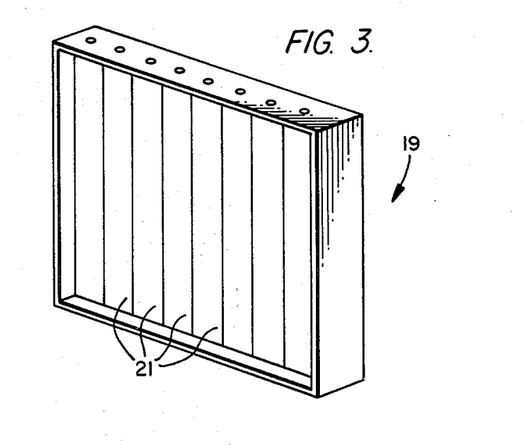
FIG. 3 is a perspective view of a damper panel which may be used in another embodiment of the present invention.

Closing one open end of housing 12 is orifice metering plate 14 containing a generally symmetrical, preferably circular orifice 16. Orifice plate 14 is also constructed of a suitable rigid material such as wood, metal or the like and is sealed essentially air-tight to housing 12. Located in the opposite end of housing 12 from orifice plate 16 are propeller-type fan 18, motor drive means 20 for driving the fan and support frame 22. The number of blades on fan 18 may vary considerably but generally three to six blades are suitable for the purposes of the present invention. Drive means 20 may be a variable speed electric motor which provides both means for rotating the fan and means for varying the rate of air flow through the orifice in a controlled manner. A particularly suitable variable speed motor for drive means 20 is a permanent split capacitor AC induction motor regulated by a TRIAC solid-state speed controller. Alternately, by using a fixed speed electric motor as drive means 20, the means for controlling the air flow can be an adjustable shutter downstream from the orifice. As is shown in FIG. 3, a shutter assembly 19 with fairly narrow shutters 21, and in which adjacent shutters are capable of being rotated in opposite directions by an appropriate linkage (not shown), is particularly suitable.

Figure 4:
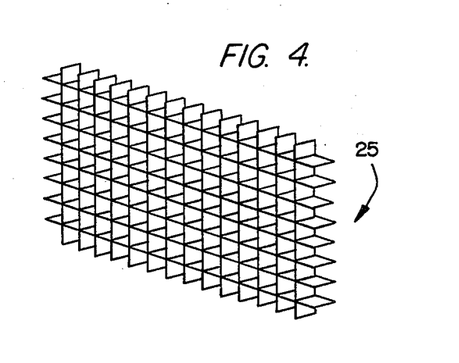
FIG. 4 is a perspective view of a vane panel which may be used in another embodiment of the device of the present invention.

In FIGS. 1 and 2, fan 18 and associated drive means 20 are mounted on support 22 such that the drive means is downstream of fan 18, the plane of rotation of the fan is approximately concentric with orifice 16, and the fan is less than about one fan diameter downstream from the orifice plate. In addition, housing 12 is preferentially symmetric about the axis of fan 18 and has a cross-sectional area perpendicular to the axis between about 1.25 to about 3.0, most preferably about 2, times the area defined by the rotating fan. Fixed concentrically about the periphery of fan 18 is airflow guide means 24 which, in this embodiment, is a generally circular venturi plate of the type that is commonly sold in conjunction with propeller type fans. Alternatively, a coaxial tube or the like (not shown) may be used as air flow guide means 24. A plurality of thin, flat vanes 26 are mounted inside housing 12 between orifice plate 14 and fan 18, the vanes tending to alter air flow, e.g., to suppress circulatory air currents generated by operation of the fan. The number and shape of vanes 26 may vary considerably. As shown, at least two, preferably three or four, radially spaced longitudinal vanes may be used. In this case, internal pressure sensing probe 28 is mounted in housing 12 between orifice plate 14 and fan 18, downstream of a vane with respect to fan rotation, and near a vane and the orifice plate. Another satisfactory arrangement is to use a relatively flat panel 25, as is shown in FIG. 4, which contains a multiplicity of narrow vane elements arranged in egg-crate or honeycomb configuration and which is mounted across the interior of housing 12 in a plane approximately perpendicular to the fan axis. With such a vane panel 25, pressure-sensing probe 28 is located between orifice plate 14 and the vane panel. The precise location of probe 28 in this area may vary considerably but a probe location between the vane panel and the fan gives less satisfactory results.

Drive means 20, as shown in FIGS. 1 and 2, may alternately be mounted upstream of fan 18 using a modified support 22. A more compact device can usually be achieved in this manner but generally at some loss in maximum fan capacity. The axes of fan 18 and drive means 20 may also be offset, and connected together by a belt drive.

The outside diameter of orifice 15 in orifice plate 14 may vary considerably, but is generally no greater than the diameter of fan 18. Good results have been obtained with the diameter of orifice 16 from about 0.5 to about 1.0 times the diameter of the fan. If it is desired to alter the diameter of orifice 16 in an already constructed device 10, orifice plate 14 may be replaced or, if the new diameter is to be smaller, an additional orifice plate (not shown) may be attached to the existing orifice plate.

Figure 5:
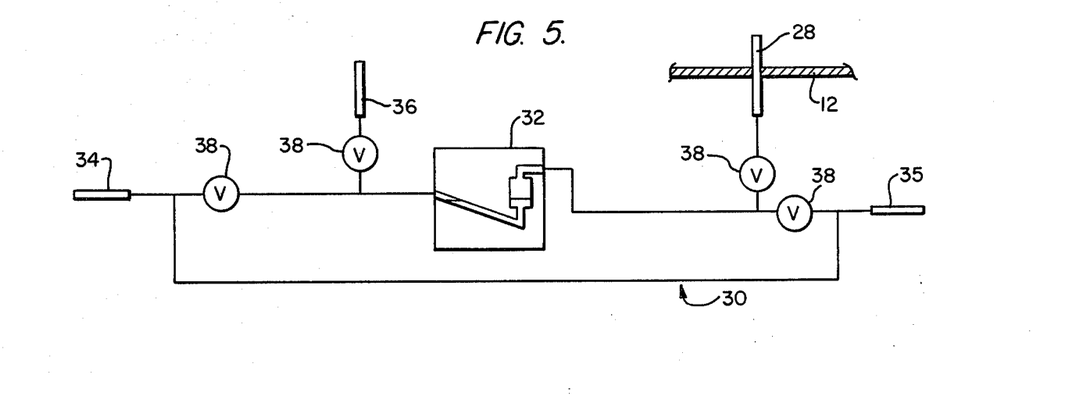
FIG. 5 is a view of one embodiment of a pressure differential sensing system to be used in conjunction with the device of FIGS. 1 and 2.

Shown in FIG. 5 is pressure differential sensing system 30 which comprises the previously-mentioned internal pressure probe 28 which projects into housing 12, pressure differential sensing means 32, e.g. an inclined tube manometer, interior pressure probes 34 and 35, exterior pressure probe 36 and shutoff valves 38. Internal pressure probe 28 of device 10, in conjunction with pressure differential sensing means 32 and interior pressure probe 34 located upstream of the orifice 16 and in the interior of the building to be tested, are used to measure air pressure differences created by flow of air through the orifice ($\Delta p$(orifice)). Pressure differential sensing means 32 is also connected to pressure probe 36 which, when used in conjunction with probe 35, are used to measure the pressure differential ($\Delta p$(out/in)) between the exterior and interior of a building during testing for air infiltration. Valves 38 are provided to connect pressure sensing means 32 with either probes 28 and 34 or probes 35 and 36 depending on the pressure differential reading being measured.

The design of vanes 26 and the location of pressure probe 28 inside housing 12 as well as other design parameters for device 10 preferably are selected on the basis of two criteria: (1) the pressure difference across orifice 16 should be related to the size of the orifice and gas flow rate through the orifice in a reproducible manner which can be expressed graphically or by a mathematical formula, and (2) the pressure readings should be insensitive to minor variations in probe position and other dimensions except orifice size of the device and its components, such as might occur in normal manufacturing operations. It is particularly convenient if the relationship in criterion (1) closely approximates the ideal orifice equation. This is the case in most of the examples cited below, but the same general considerations would apply to any other relationship which can be expressed by a formula or graph.

The ideal orifice equation referred to above is:

$$\text{Air flow } (CFM) = 5.98 \, K \, D^2 \sqrt{\Delta p(\text{orifice}) \times V}$$

where
$\Delta p(\text{orifice})$ = pressure drop across orifice, inches wc
D = diameter of orifice, inches
V = specific volume of air, cubic feet/lb.
K = orifice coefficient (calibration constant)

Assuming that the air is at 72° F., 760 torr and 50% relative humidity, V has a value of 13.96 and the above orifice equation then becomes;

$$\text{Air flow } (cfm) = 21.94 \, K \, D^2 \sqrt{\Delta p(\text{orifice})}$$

As was mentioned above, certain parameters for the design of device 10 are preferably selected so that the air flow closely follows the orifice equation. Since the orifice equation was derived for a specific arrangement of an orifice mounted at a flange joint between straight sections of pipe, the equation is not universally applicable to devices such as shown in FIGS. 1 and 2 as a flow condition differs radically in an flange mounted orifice from those of the device in which the orifice plate is exposed on one side to stationary air and on the other side is in close proximity to a rotating fan. It has been found that flow through an orifice mounted in front of a fan did not in general closely allow the orifice equation but that close agreement did result by the appropriate selection of design variables. The coefficient K of the orifice equation can be calculated theoretically for the case of an orifice in a pipe, and lies between 0.62 and 1.00, depending on the dimensions of pipe and orifice, and flow conditions as represented by the Reynolds Number. However, there is no such theoretical basis for making such a calculation for the orifice metering fan device of the subject invention and K must be determined by calibration. Values determined experimentally have averaged about 0.55, which is well below the theoretical limit of 0.62 for an orifice in a pipe.

From an investigation of the various design parameters for the subject device, it has been determined that several design features contribute significantly to the ability of the device to accurately and reproducably provide measurements of gaseous flow. These important design features can include the inclusion of vanes, location of the internal pressure probe relative to the orifice, fan housing and vanes, orientation of the pressure probe opening and the shape and orientation of the confining means relative to the fan and orifice. More specifically, it has been found that the inclusion of one or more vanes oriented in a generally axial direction appears to be necessary for the proper functioning of the device. It is believed that the vanes tend to minimize circulatory gas currents as the gas passes through the device so that the internal pressure probe tends to measure a more representative pressure regardless of the position of the probe.

As to the location of the internal pressure probe so as to provide relatively constant orifice pressure readings, this will vary in scale with fan size, and dimensions given are for an 18-inch diameter fan. For the vane arrangement illustrated in FIGS. 1 and 2, preferably the probe should be downstream of a vane with respect to the rotational thrust of the fan, the probe should be laterally spaced about 0.5 to 3 inches, more preferably about one inch, from the vane and spaced abut 0.5 to 2 inches, more preferably about one inch, from the orifice plate. The distance the probe projects into the housing appears to have little or no effect on the constancy of measurements of $\Delta p(\text{orifice})$ as long as the probe is downstream from a vane and is out of the direct gas stream from the orifice. For example, an interior projection of about one inch is generally satisfactory. In a similar manner, there is no detectible effect of probe orientation, i.e., the direction the probe opening faces such as upstream, downstream or at right angles to gas flow, whether either upstream or downstream of the vanes. However, upstream values for $\Delta p(\text{orifice})$ are generally higher than downstream values. When a panel array of narrow vane elements extending across the interior of the housing is used, the exact location of the probe may vary considerably as long as the probe is between the panel and the orifice plate. A location about one inch from the orifice plate and projecting inward about one inch is satisfactory. Probe locations downstream of the panel array (between the panel array and the fan) give less satisfactory results.

To use the devices of the present invention as illustrated in FIGS. 1 to 5 to determine air infiltration in a building, initially the device should be calibrated so as to establish the coefficient K of the orifice equation for the particular device. Calibration can be accomplished in a number of manners, the concept being to determine the actual rate of flow through the device at a particular fan speed and pressure drop and solving the orifice equation for the K coefficient. One particularly suitable manner for determining the actual air flow rate is to utilize a calibration unit such as the embodiment shown in FIG. 6. Calibration unit 40 comprises circular duct 42 of rigid material such as metal and having a length about twice its diameter. Duct 42 has a short tapered section 44 on one end which is adapted to fit about orifice 16 or orifice plate 14. Attached to the other end of duct 42 is converging venturi inlet 46. Pitot tube 48 is movably mounted along the radius of duct 42 a short distance from tapered end 44 of the duct.

Figure 6:
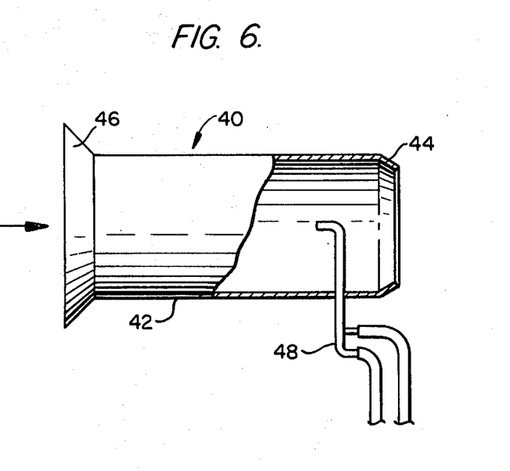
FIG. 6 is a cross-sectional view of a calibration unit for use in calibrating the embodiment of the device shown in FIGS. 1 and 2.

To calibrate device 10 using calibration unit 40, the unit is attached to orifice plate 14 of device 10 installed in a building to be tested. Air flow generated by fan 18 is then adjusted to yield a desired $\Delta p(\text{out/in})$ in the building. Pitot tube measurements are made at various distances, r, from the center of duct 42, a plot is made of $\sqrt{\Delta p(\text{Pitot})}$ versus $r^2$, and values taken from this plot at equal increments of $r^2$ are averaged. This average is then used to calculate true air flow through calibration device 40. The calibration device is then removed, and airflow/K is determined for device 10 at the same $\Delta p(\text{out/in})$ in the building, by measuring $\Delta p(\text{orifice})$ and applying the ideal orifice equation. Calibration constant K can then be determined for device 10. If device 10 does not fit the orifice equation with sufficient accuracy, but results are expressible by some other formula, or graphically, an analogous procedure can be used to determine the constants in the formula, or a calibration curve can be constructed from measurements of true air flow and airflow/K at a number of points over the flow range of interest.

Once device 10 is calibrated, the device may then be used to determine the previously-mentioned ATPH index for any building and, in addition, to locate sources of air infiltration in the building. To do so, device 10 is installed in a suitable window or door in the building and all other openings in the building are closed. After attaching the components of pressure differential sensing system 30 to the appropriate locations, fan 18 is started and its speed adjusted to produce an exterior to interior pressure differential Δp(out/in) of about 0.1 inches of water column. Internal probe 28 is then connected to pressure sensing means 32 and the pressure differential Δp(orifice) is measured. Using the appropriate calibration, air-flow rate is then determined. This, together with the cubic volume of the building, permits its ATPH at the given Δp(out/in) to be calculated using the formula given earlier. If the ATPH value of the building is unacceptably high, e.g., above about 5.0, airflow through fan 18 is then increased to increase the out/in differential pressure up to about 0.4 inches wc so as to allow the sources of air infiltration in the building to be easily located, e.g., by physically detecting drafts.

Figure 7:
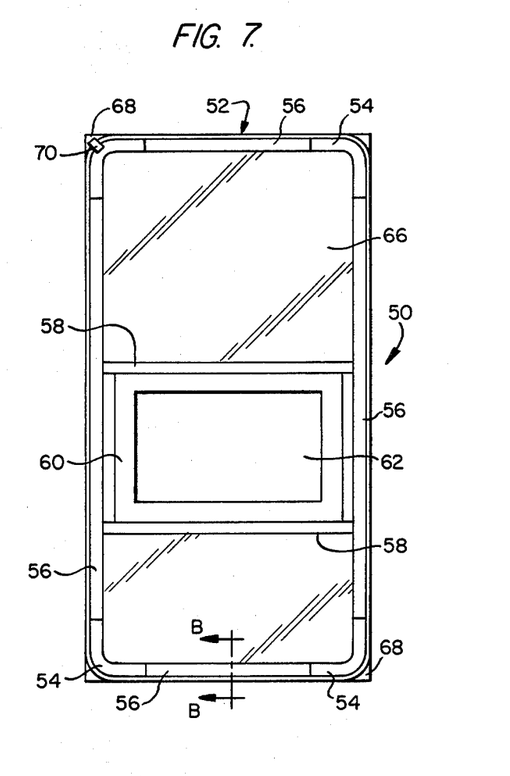
FIG. 7 is a frontal view of one embodiment for a panel for mounting a device of FIGS. 1-4 within an opening of a building.
Figure 8:
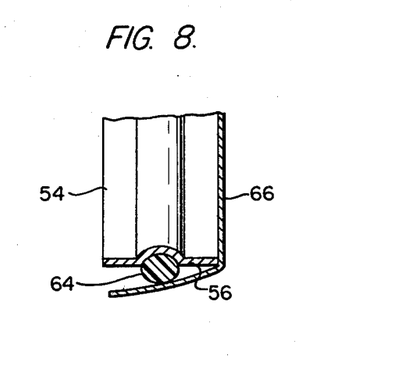
FIG. 8 is a cross-sectional view of a portion of the panel of FIG. 7 taken along line B—B.
Figure 9:
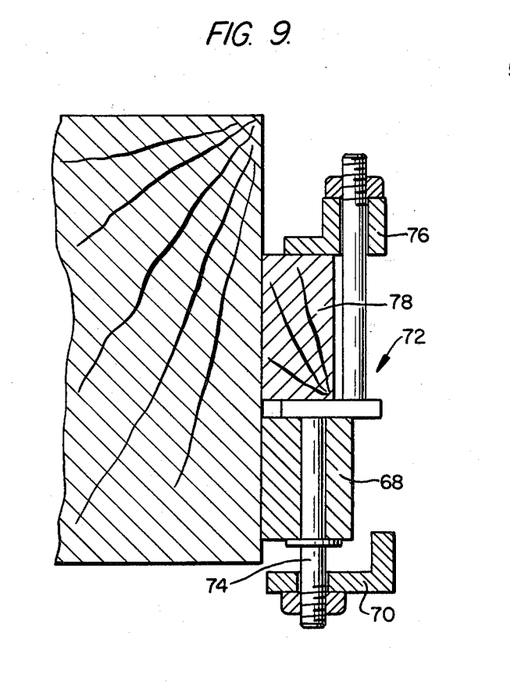
FIG. 9 is a cross-sectional view of a corner portion of the panel of FIG. 7 when the panel is installed within a doorway of a building.

One suitable panel 50 for mounting device 10 within a window or door of a building in an essentially air tight manner is illustrated in FIGS. 7–9. Mounting panel 50 is light weight, dimensionally adjustable and demountable so as to enable device 10 to be simply and easily be mounted in a wide variety and sizes of doors and windows as well as to enable convenient transport and storage of the panel.

Mounting panel 50 comprises outer frame 52 assembled from steel channel material such as that manufactured by the Knapp-Vogt Corp. and sold for the installation of shelving. Frame 52 includes curved 90° bend channels 54 for forming the corners of the frame and straight length channels 56 for the sides, top and bottom of the frame. Each type of channel 54 and 56 is provided with holes at frequent intervals along its length thereby permitting flexibility and adjustability in size for assembled frame 52 and by elongating these holes in selected location, fine-scale flexibility of the size of frame 52 may be achieved. Cross-pieces 58 of frame 52 may be of the same channel material as used for channels 54 and 56 and provide structural stability for the frame. Within frame 52 and mounted between the two cross-pieces 58 is an inner panel frame 60 having opening 62 which is of a size to snugly accommodate the orifice metering fan device 10.

As is best shown in FIG. 8, about the periphery of frame 52 and in the groove of channels 54 and 56 is deformable sealing means 64, for example, an elongated piece of closed-cell elastomer foam material or an inflatable, hollow rubber tube. The cross-sectional size of sealing means 64 is such that it projects well outside of the groove in frame 52 so as to enable panel 50 to be sealed against the lateral surfaces of a window or door opening.

Extending across one face of frame 52 is flexible, air-impermeable membrane 66 made of, for example, polyethylene film. Membrane 66 is sealed about the opening 62 in inner panel 60 by securing means such as screws or the like (not shown). At the outer perimeter of frame 52, the membrane extends beyond and around sealing means 64. Sealing means 64 is used to press membrane 66 against the inside surface of a opening at the sides, top, and bottom, and against triangular inserts 68 at the corners of frame 52, thereby providing a generally leakproof seal.

Corner insert 68 is attached at each of the four corners of frame 52 and is held in place by means such as clamping device 70 as is shown in FIG. 9. Inserts 68 are generally triangular in shape so as to provide a sealing surface against which sealing means 64 may bear and provide a rectangular shaped panel 50 which fits within the opening for a door or window. Holding clamping device 70 to insert 68 is retainer 72 comprising offset rod assembly 74 which passes through the insert and is provided with member 76. Retainer 72 enables panel 50 to be securely fastened to stop 78 forming a part of the structure of a door or window. Retainer 72 thereby serves to hold panel 50 in place against the air pressure difference created by the operation of device 10. Under normal test conditions and with device 10 mounted in a standard door opening, the force of air pressure against panel 50 may be up to about 40 pounds or more, which is too great to be dependably resisted by frictional forces around the periphery of the panel. Consequently, the use of retainer 72 is generally necessary unless panel 50 is mounted in the opening in such a way that the thrust of air is against the stop, or unless the panel fits into a recess in the inner surface of the opening which prevents it from moving in either direction.

An air infiltration testing device according to the present invention, its calibration and use in determining air infiltration are presented in the following examples. It should be understood that the examples are for the purpose of illustration only and the examples do not limit the invention as has heretofore been described.

For simplicity, the device is described in terms of exhausting air from a building and generating a subatmospheric pressure in the interior. This is not in any way to be considered as a limitation since the device may be mounted in the reverse direction in the building opening with the orifice facing toward the outside and similar tests can be made with air being transferred into the building and generating a positive relative pressure in the interior.

EXAMPLE I

A testing device similar to that shown in FIGS. 1 and 2 was constructed using an eighteen inch, four-blade fan mounted on a 1725/1140 rpm, $\frac{1}{3}$ horsepower electric motor manufactured by Dayton Electric Mfg. Co., Chicago, Ill., U.S.A. and sold under unit stock number 7F464. The fan was mounted in a venturi plate of 22 $\frac{1}{8} \times 22 \frac{1}{8}$ inch dimensions. The fan speed was controlled by a variable voltage transformer sold under the tradename Powerstat model EN-116 manufactured by Superior Electric Co., Bristol Conn., U.S.A. The housing for the device was constructed of $\frac{3}{8}$ inch plywood, the joints being sealed with tape. The housing cross-section was about 23×23 inches and the housing had a depth of about fifteen inches. The orifice plate with the orifice at the center was also of $\frac{3}{8}$ inch plywood and was mounted at the end of the housing. Two orifice plates were used in subsequent experiments, one having a 12 inch diameter orifice and the other having a 15 inch diameter orifice. The pressure differential sensing means used was a slant-tube manometer with a range of 0–1 inches by 0.01 inch divisions sold under model number B-622 by Meriam Instrument Co., Cleveland, Ohio.

Four longitudinal vanes, each about 7×6 inches, were mounted inside the housing between the orifice and the fan to minimize rotational air currents. The vanes were approximately equally spaced and extended from the orifice plate almost to the fan venturi plate.

The internal pressure probe projected into the housing about one inch and was located about one half inch downstream from a vane and about one half inch from the orifice plate.

EXAMPLE II

The above described device was then operated under actual testing conditions to determine whether the device gave reproducable results with varying pressure differentials created by the fan and with varying sized orifices.

The device was mounted in the downstairs door opening a two story residential home having a downstairs volume of about 7200 cubic feet and total volume of about 19,200 cubic feet. Air infiltration into the home had previously been reduced to a relatively low level by sealing various sources of air leakage. During operation of the devices various pressure measurements were made using a manometer, all values being expressed in inches water column (wc). The pressure measurements made were $\Delta p(out/in)$, the difference between pressure outside the house measured via tube through wall and the inside room pressure, $\Delta p(orifice)$, the difference between room pressure and pressure at probe downstream from orifice and $\Delta p(Pitot)$, the difference between static pressure and velocity head as measured by a Pitot tube in an airflow stream.

For each of the four combinations of house volume of downstairs along and the whole house and orifice size 12 and 15 inches, fan speed was adjusted to vary the $\Delta p(out/in)$ from 0.1 to 0.4 inches wc in increments of 0.05 inches. At each level, a corresponding $\Delta p(orifice)$ value was measured and used to calculate the value of Airflow (CFM)/K with the orifice equation:

$$\text{Airflow } (CFM)/K = 21.94 \, D^2 \sqrt{\Delta p(\text{orifice})}$$

If the resultant data fit this equation, Airflow (CFM)/K should be the same for the two orifice sizes at each level of $\Delta p(out/in)$ and would indicate that reproducable and accurate results could be achieved from operation of the device. The following results were obtained;

operation of the device agrees closely with the ideal defined by the orifice equation.

EXAMPLE III

The device used in the previous examples having a twelve inch orifice is then calibrated by determining the constant K of the orifice equation so that determinations of air flow rate and thus APTH can be made.

With the fan mounted in the doorway of the house, the fan speed was adjusted to give a $\Delta p(out/in)$ of about 0.2 in. wc, first while drawing air from the downstairs only, and then from the whole house. Corresponding $\Delta p(orifice)$ values were about 0.149 and about 0.930 in. respectively. A calibration unit was then inserted and sealed in the orifice opening, the unit consisting of a 24-inch length of 12-inch diameter metal duct having a short tapered section on the end which fitted about the orifice and a venturi converging inlet attached to the other end. A Pitot tube was movably mounted along a radius of the cylindrical duct about three inches from the end nearest the orifice. The value of $\Delta p(out/in)$ was adjusted to 0.2 in. wc in drawing air from downstairs only and then the $\Delta p(Pitot)$ was measured at $\frac{1}{2}$ inch intervals along a radius from the center to near the wall of the duct. A similar set of measurements was made while drawing air from the whole house. The $\sqrt{\Delta p(Pitot)}$ values were averaged over the duct cross-section for each set of data by plotting them against $r^2$ (r=probe distance from the center of the duct), making a smooth curve through the points, taking values from the curve at 12 equal intervals along the $r^2$ axis, ($r^2 = 1.5, 4.5, 7.5, \ldots 34.5$), and averaging these values. Air flow was calculated by the following equation;.

$$\text{Flow } (CFM) = 5.98 \, D^2 \sqrt{\Delta p(\text{Pitot}), \text{Avg.} \times V}$$

$$= 3159 \sqrt{\Delta p(\text{Pitot}), \text{Avg.}}$$

where
D = 12 in.
V = 13.46 cu. ft./lb. @ 72° F. & 50%RH

| | Fit of Data with Orifice Equation | | | | | |
|---|---|---|---|---|---|---|
| | 12-Inch Orifice | | 15-Inch Orifice | | | |
| $\Delta p(Out/In)$ | $\Delta p(Orifice)$ (1) | CFM/K* | $\Delta p(Orifice)$ (2) | CFM/K* | (1)/(2) | Error, % |
| Downstairs | | | | | | |
| 0.10 | 0.060 | 774 | 0.026 | 796 | 0.972 | 2.8 |
| 0.15 | 0.103 | 1014 | 0.043 | 1024 | 0.990 | 1.0 |
| 0.20 | 0.152 | 1232 | 0.063 | 1239 | 0.994 | 0.6 |
| 0.25 | 0.205 | 1430 | 0.085 | 1439 | 0.994 | 0.6 |
| 0.30 | 0.262 | 1617 | 0.110 | 1637 | 0.988 | 1.2 |
| 0.35 | 0.320 | 1789 | 0.133 | 1800 | 0.994 | 0.6 |
| 0.40 | 0.385 | 1960 | 0.160 | 1975 | 0.992 | 0.8 |
| Whole House | | | | | | |
| 0.10 | 0.330 | 1815 | 0.145 | 1880 | 0.965 | 3.5 |
| 0.15 | 0.575 | 2396 | 0.248 | 2458 | 0.975 | 2.5 |
| 0.20 | 0.950 | 3079 | 0.365 | 2982 | 1.033 | 3.3 |
| 0.215(Max) | 1.05 | c.3237 | — | | | |
| 0.25 | | | 0.525 | 3577 | | |
| 0.30 | | | 0.665 | 4026 | | |
| 0.325(Max) | | | 0.718 | 4183 | | |
| | | | | Average Error, %: | | 1.7 |

*Flow Rate (CFM)/K = $21.94 \, D^2 \sqrt{\Delta p(\text{orifice})}$

As is shown in the above table, deviations of the ratio CFM/K (12 in. orifice)/CFM/k(15 in. orifice) from unity average only about 1.7%. As is apparent, the Under comparable conditions for the orifice metering fan device of the present invention, air flow is determined by;

$$\text{Flow }(CFM)/K = 3159 \sqrt{\Delta p(\text{orifice})}$$

Both flows are equal to the rate of air leakage into the house at a $\Delta p(\text{out/in})$ of 0.2 in. wc, and the flows are therefore equal to each other. Consequently, the constant K can be calculated by;

$$K = \sqrt{\Delta p(\text{Pitot}), \text{Avg.}} / \sqrt{\Delta p(\text{orifice})}$$

The following data was generated;

| Pitot Readings at 0.2 Inches $\Delta p(\text{Out/In})$ | | | | | |
|---|---|---|---|---|---|
| | $\Delta p$(Pitot) | | | From Plot of $r^2$ vs. $\sqrt{\Delta p(\text{Pitot})}$ | |
| | | | | $\sqrt{\Delta p(\text{Pitot})}$ | |
| r | Downstairs | Whole House | $r^2$ | Downstairs | Whole House |
| 0.0 | 0.053 | 0.315 | 1.5 | 0.232 | 0.561 |
| 0.5 | 0.054 | 0.315 | 4.5 | 0.228 | 0.558 |
| 1.0 | 0.053 | 0.315 | 7.5 | 0.227 | 0.554 |
| 1.5 | 0.053 | 0.315 | 10.5 | 0.226 | 0.549 |
| 2.0 | 0.052 | 0.310 | 13.5 | 0.224 | 0.543 |
| 2.5 | 0.052 | 0.305 | 16.5 | 0.223 | 0.537 |
| 3.0 | 0.051 | 0.303 | 19.5 | 0.222 | 0.529 |
| 3.5 | 0.050 | 0.300 | 22.5 | 0.218 | 0.519 |
| 4.0 | 0.050 | 0.290 | 25.5 | 0.212 | 0.508 |
| 4.5 | 0.048 | 0.275 | 28.5 | 0.207 | 0.496 |
| 5.0 | 0.045 | 0.265 | 31.5 | 0.193 | 0.485 |
| 5.25 | 0.044 | 0.250 | 34.5 | 0.172 | 0.471 |
| 5.5 | 0.040 | 0.240 | | | |
| | | | Average | 0.215 | 0.526 |

A summary of calibration test results was:

| Value | Downstairs | Whole House |
|---|---|---|
| $\Delta p$(orifice), in.wc | 0.149 | 0.930 |
| $\sqrt{\Delta p(\text{orifice})}$ | 0.386 | 0.964 |
| K, Calibration constant | 0.557 | 0.546 |
| Flow (CFM) at 0.2 in. wc. | 679 | 1662 |
| K(mean value) | | 0.55 |

EXAMPLE IV

The previously obtained data as to $\Delta p$(orifice) from Example II were used to calculate the Air Infiltration Index (ATPH at 0.1 inch wc $\Delta p$(out/in)) for the test house. Air flows were calculated using K coefficient of 0.55 and the relationship;

$$ATPH = \frac{(\text{air flow at } 0.1 \; \Delta p(\text{out/in})) \times 60}{\text{House volume}}$$

Data and calculated results were:

| Value | Downstairs | | Whole House | |
|---|---|---|---|---|
| Orifice Dia., in. | 12 | 15 | 12 | 15 |
| $\Delta p$(orifice) at $\Delta p$(out/in) of 0.1 in.wc | 0.060 | 0.026 | 0.330 | 0.145 |
| Air flow, CFM | 426 | 438 | 998 | 1,034 |

| Value | Downstairs | | Whole House | |
|---|---|---|---|---|
| Orifice Dia., in. | 12 | 15 | 12 | 15 |
| House Volume, cubic ft. | 7,200 | | 19,200 | |
| ATPH (infiltration Index) | 3.6 | 3.7 | 3.1 | 3.2 |

From the above, it is apparent that both downstairs and the whole-house areas of the home fall within the "acceptable" ATPH limits of about 1.5 to about 5.0.

EXAMPLE V

The device of the present invention was then utilized to locate the sources of air infiltration in the previously mentioned house by maximizing air infiltration into the house and then detecting such sources.

With the device exhausting the downstairs area only, the speed of the fan was adjusted to yield a maximum $\Delta p$(out/in) of about 0.4 inches wc. Generally, pressures above this level are not recommended for reasons of possible damage to the structure of the house. Various locations of the house were inspected for air leaks by physically feeling for drafts. Leaks were quite apparent in several places, e.g., from several electrical wall outlets which had not been sealed with polyurethane foam gasket material, at the junction between a sheet-rock wallboard and a concrete floor, around the sides of the cold air return register for the heating system, at the bottom of the trim around several exterior doors, and at the fire place damper. By correcting these leaks, the air infiltration index can be reduced.

EXAMPLE VI

The device of the invention was then tested to determine the maximum capacity of various fan arrangements to exhaust air from the test house as indicated by the maximum $\Delta p$(out/in) generated with the fan motor at full power with either a 12 or 15-inch orifice or with no orifice, i.e., with the orifice plate removed. These fan arrangements are described below;

| Description | Maximum $\Delta p$(out/in), inches wc. | | |
|---|---|---|---|
| Orifice: | 12-inch | 15-inch | None |
| Fan motor upstream Venturi correct | 0.132 | 0.203 | 0.257 |
| Fan motor downstream Venturi backwards | 0.195 | 0.215 | 0.215 |
| Fan motor downstream venturi correct | 0.190 | 0.275 | 0.275 |
| Fan motor downstream Venturi correct plus vanes | 0.215 | 0.325 | 0.305 |

From the above table, the capacity as measured by the maximum $\Delta p$(out/in) is increased by having the fan mounted in a suitable air flow guide, such as a venturi panel, by mounting the drive motor downstream of the fan, and by installing air straightening vanes between the orifice plate and the fan. However, mounting the motor upstream of the fan can result in a more compact device. Hence, the best arrangement of device elements for an intended use may be determined by comparing the advantages and disadvantages of the various factors with respect to that use.

The device described in Example 1 was modified by replacing the fan motor, a split-phase type rated ¼ horsepower at 1725 rpm, with a ¾ horsepower, 1625 rpm, permanent split capacitor type motor, stock No. 3998 manufactured by the General Electric co. A propeller blade selected to match the speed and power characteristics of this motor was also substituted. Upon testing, it was found that not only was the air capacity of this arrangement substantially higher, as anticipated, but the range of speeds attainable and the ability to maintain a given speed, particularly at the low end of the range, was very much improved with this type of motor. Furthermore, the weight of the motor and its length in the radial direction were substantially lower thereby providing a lighter, more compact device.

In addition to the above, the variable voltage transformer of Example 1 was replaced by a Varispeed motor speed control of the TRIAC solid state type, manufactured by KB Electronics, Brooklyn, N.Y. This device provided suitable speed control, with a further major reduction in weight and lower cost.

Furthermore, the radially oriented vanes of Example 1 were replaced with a flat panel of thin, ½-inch wide vanes in an "egg-crate" or honeycomb configuration on ½-inch centers. This panel was mounted two inches downstream from and parallel to the orifice plate, five inches upstream from the fan venturi plate, and extending across the interior of the housing. When a pressure sensing probe was tested in various locations in the space between the orifice plate and the vane panel, it was found to be accurately responsive to air flow rate through the orifice, but relatively insensitive to its specific location in that space. Very erratic readings were obtained when the probe was tested in the space between the vane panel and the fan. Two further advantages of the panel vane arrangement were observed. Firstly, it acted as a guard to prevent injury from contact with the fan blades, and to keep objects from being drawn into the fan. Secondly, it permitted assembly of a device which was particularly compact in the axial direction.

The device of Example I was modified by extending housing about 4 inches beyond motor support. A damper to control air flow was installed in this extension, consisting of 5 vanes, each 22 by 4.5 inches, rotatable symmetrically about their long axes, and on centers about 4.5 inches apart. A micrometer screw arrangement provided fine control of vane rotation. The device was mounted in a door of a building as described previously, and tested for its ability to generate a controlled flow of air and to measure the rate of flow. While maintaining the speed constant varying the damper position a very satisfactory control of air flow rate was attained as judged by the ability to set and maintain $\Delta p(out/in)$ at a certain value. Readings of $\Delta p(orifice)$ made at different flow rates, however, were quite different from those made previously with the device using motor speed to control air flow. Furthermore, readings differed at different locations around the orifice plate (top, bottom, right, left).

The linkage controlling the damper vanes in the above device was altered to rotate them asymmetrically such that adjacent vanes rotated in opposite directions. Upon testing, this arrangement gave $\Delta p(orifice)$ readings which agreed better with experience using motor speed control of air flow and also varied relatively little with probe location around the orifice plate.

The five damper vanes of the above device were replaced with a similar arrangement, but with a larger number of narrower vanes (10 vanes, each 22 by 2.25 inches, on 2.25 inch centers). Upon testing, agreement with previous experience was satisfactory and there was little or no difference in $\Delta p(orifice)$ readings at different locations around the orifice plate.

As is apparent from the previous description, the orifice metering type devices of the present invention have a number of advantages when used as a device for determining air infiltration in buildings and other uses. Among others, the devices according to the present invention can be of a compact size and relatively light weight which makes it practical for one person to transport and install the device for an air infiltration test. In addition, the device can be constructed from commercially available components and inexpensive construction materials and therefore has a relatively low cost. In addition, the device has a relatively simple design and can be easily operated since its use involves the simple procedures of adjusting fan speed, reading two pressure differential measurements, and using a formula, table or graph to determine fan exhaust rate. Consequently, the device can be operated very easily by unskilled personnel. Furthermore, the orifice metering fan device of the present invention may also be useful in other applications where air or another gas is transferred and it is desired to know the volume rate of transfer.

While the present invention has been described with reference to particular embodiments thereof, it will be understood that numerous modifications may be made without departing from the spirit and scope of the invention.

It is claimed:

1. A device for transferring a gas and simultaneously measuring the volume flow rate of the gas, the device comprising
   a propeller-type fan for generating gas flow, said fan mounted within air-flow guide means concentrically spaced about the fan perimeter,
   drive means for rotating the fan,
   an orifice located upstream from the fan, the orifice comprising an opening in a plates said plate mounted at one end of a housing, which extends from the plate and encloses at least the air flow guide means of the device, the plane of the plate being approximately parallel to the plane of rotation of the fan, and the orifice and fan being spaced less than one fan diameter apart,
   said housing enclosing the space between the orifice plate and air flow guide means,
   means to adjust gas flow rate through the orifice in a controlled manner,
   one or more vanes mounted inside the housing between the fan and the orifice plate so as to direct gas flow in a generally axial direction relative to the fan, and
   pressure sensing means within the housing and located between the orifice plate and the fan.

2. A device according to claim 1, wherein the vanes are one or more flat plates extending radially inward from the housing and axially from the plane of the orifice plate.

3. A device according to claim 2, wherein the pressure sensing means is located downstream of a vane with respect to the rotational thrust of the fan and near the orifice plate and the vane.

4. A device according to claim 1, wherein the vanes are a plurality of narrow vane elements arranged in an ordered array in a panel, the panel extending across the interior of the housing in a plane approximately perpendicular to the fan axis and being located between the orifice plate and the fan.

5. A device according to claim 4, wherein the pressure sensing means is located between the orifice plate and the vane panel.

6. A device according to claim 1, wherein the drive means is a variable speed electric motor.

7. A device according to claim 6, wherein the drive means is a permanent split capacitor ac induction motor and the gas flow rate adjusting means is a voltage regulating device connected to the motor.

8. A device according to claim 1, wherein the gas flow rate adjusting means is a damper located downstream of the orifice plate.

9. The device according to claim 8, wherein the damper includes rotatable vanes, and adjacent vanes of the damper capable of rotating in opposite directions.

10. A device according to claim 1, wherein the drive means is an electric motor connected directly to the fan.

11. A device according to claim 1, wherein the fan drive means is an electric motor connected directly to the fan and mounted upstream of the fan.

12. A device according to claim 1, wherein the fan drive means is an electric, variable speed motor and the fan and motor axes are offset from each other.

13. A device according to claim 1 further comprising means for measuring the pressure differential between the pressure sensing means and the space upstream of the orifice.

14. A device according to claim 1, wherein the orifice and the fan are generally concentric.

* * * * *